United States Patent [19]

Hurst

[11] Patent Number: 4,912,744
[45] Date of Patent: Mar. 27, 1990

[54] VEHICLE SPEED ESTIMATION IN ANTI-LOCK BRAKING SYSTEMS

[75] Inventor: David C. Hurst, Solihull, England

[73] Assignee: Lucas Industries public limited company, Birmingham, England

[21] Appl. No.: 363,993

[22] Filed: Jun. 9, 1989

[30] Foreign Application Priority Data

Jun. 23, 1988 [GB] United Kingdom ............... 8814931

[51] Int. Cl.⁴ .................... B60T 8/68; B60T 8/60
[52] U.S. Cl. .................... 303/109; 303/95; 303/103; 188/181 C
[58] Field of Search .............. 303/91, 109, 108, 107, 303/95–99, 100, 102, 103; 188/181 C; 364/426.02, 426.01

[56] References Cited

U.S. PATENT DOCUMENTS

| | | | |
|---|---|---|---|
| 3,401,983 | 9/1968 | Reid, Jr. ................. | 303/107 X |
| 3,674,318 | 7/1972 | Hickner et al. ............. | 303/109 X |
| 4,037,882 | 7/1977 | Taylor .................... | 303/107 |
| 4,530,059 | 7/1985 | Brearley et al. ............ | 303/97 X |
| 4,720,794 | 1/1988 | Skarvada .................. | 303/109 X |
| 4,762,375 | 8/1988 | Maki et al. ............... | 303/96 |
| 4,774,667 | 9/1988 | Kuraoka et al. ............ | 303/109 X |
| 4,787,682 | 11/1988 | Muto ...................... | 303/109 |
| 4,818,037 | 4/1989 | McEnnan .................. | 303/103 X |
| 4,852,951 | 8/1989 | Matsuda .................. | 303/109 |

Primary Examiner—Douglas C. Butler
Attorney, Agent, or Firm—Scrivener and Clarke

[57] ABSTRACT

An anti-lock system for controlling the slip level on one or more wheels of a vehicle by comparing the actual wheel speed with a vehicle reference speed obtained by processing wheel speed signals through a filtering system, the filtering system comprising a selection device which produces an input signal from one or a combination of the wheel speeds, an error forming device which subtracts the required vehicle speed estimate from the input signal to produce a speed error, a non-linear device which is effective to limit the slew rate of the filtering system in both positive and negative directions in accordance with vehicle characteristics, a secondary filter which reduces transients present in the error signal, and an integration device which accumulates the error signal and whose output is fed back to the error forming device as the required vehicle speed estimate.

17 Claims, 12 Drawing Sheets

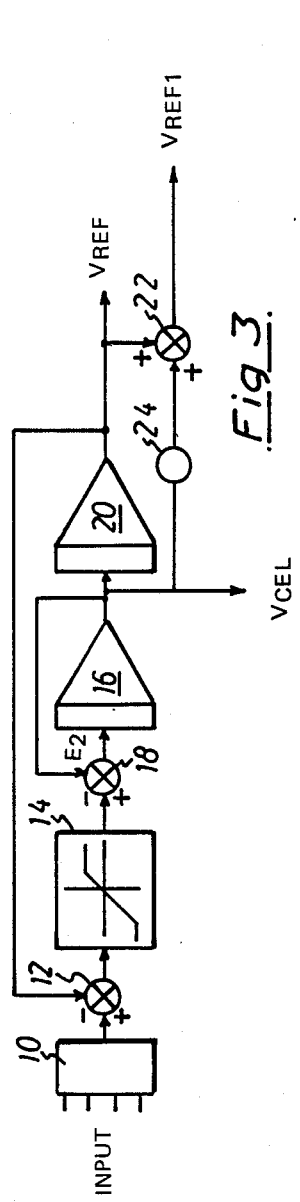
_Fig 3._
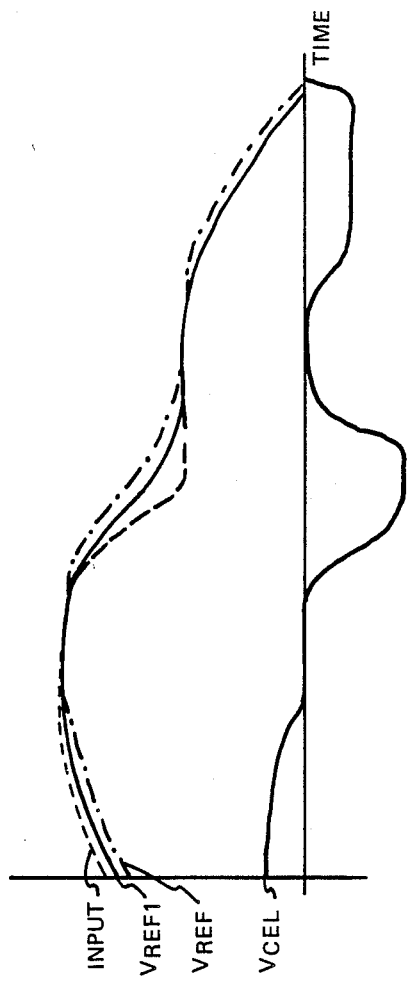
_Fig 4._

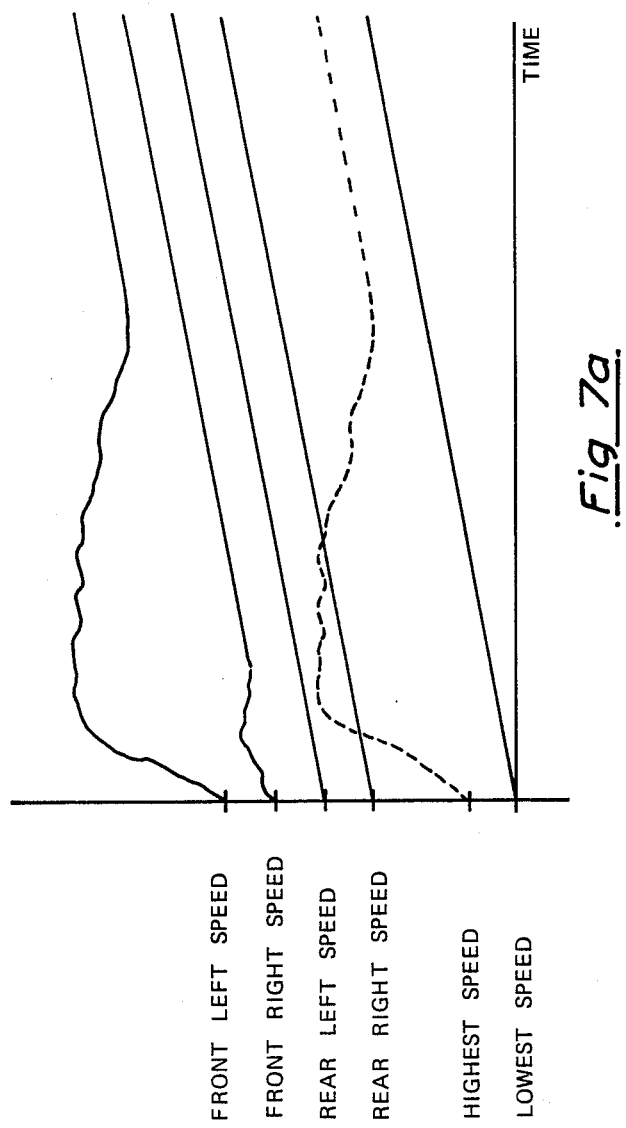

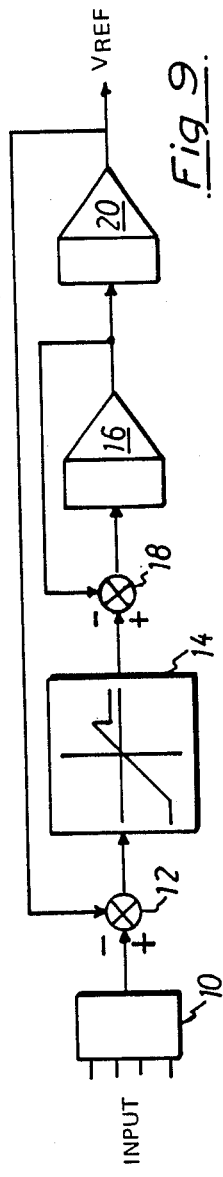
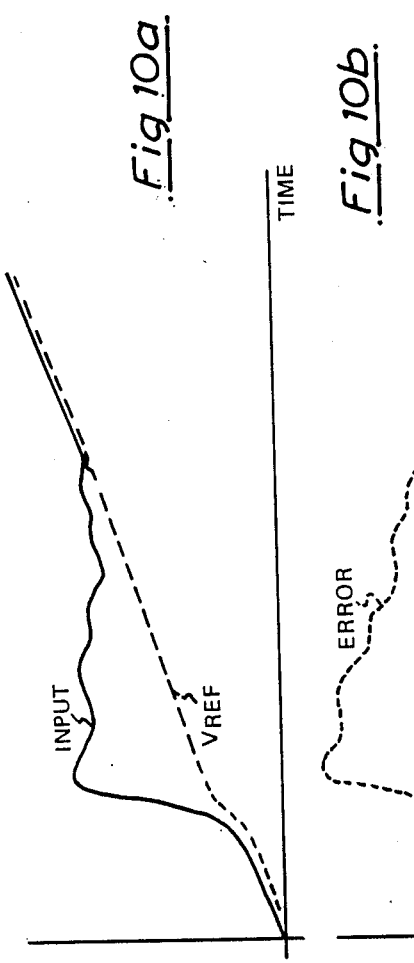
Fig. 9
Fig. 10a
Fig. 10b

VEHICLE SPEED ESTIMATION IN ANTI-LOCK BRAKING SYSTEMS

The present invention relates to anti-lock systems for vehicle brakes and is concerned in particular with a means for providing an estimation of the prevailing vehicle speed.

In an anti-lock braking system it is desirable to have knowledge of the prevailing speed of the vehicle in order to enable wheel slip calculations to be performed and wheel speed recoveries to be monitored. In early analogue anti-lock systems, each wheel channel tended to be separate and the only concept of vehicle behaviour available to the system was that of slip storage during anti-lock cycles. This consisted of storing the amount of slip built up by the wheel during a skid so that the end of the subsequent recovery could be predicted. With the subsequent advent of digital systems, the usual practice was to use a simple digital model of the earlier analogue systems.

It is an object of the present invention to provide an improved means of estimating vehicle speed in anti-lock braking systems which is more accurate than the means used hitherto.

In accordance with the present invention, there is provided an anti-lock system for controlling the slip level on one or more wheels of a vehicle by comparing the actual wheel speed with a vehicle reference speed obtained by processing wheel speed signals through a filtering system, the filtering system comprising a selection means which produces an input signal from one or a combination of the wheel speeds, an error forming device which subtracts the required vehicle speed estimate from the said input signal to produce a speed error, a non-linear device which is effective to limit the slew rate of the filtering system in both positive and negative directions in accordance with vehicle characteristics, a secondary filter which reduces transients present in the error signal, and an integration device which accumulates said error signal and whose output is fed back to said error forming device as the required vehicle speed estimate.

Advantageously, the input to said integration device is extracted as indicative of the vehicles acceleration, a proportion of this extracted signal being arranged to be added to the output of the main filtering system to form a better approximation to the true vehicle speed.

In one embodiment, the vehicle acceleration signal extracted from said integration device is passed through another filter adapted to enhance the information contained therein. Preferably, this further filter comprises a further error forming device which extracts the output of the main filter from the acceleration signal to form an acceleration error signal, a second non-linear device through which the acceleration error signal is passed to suppress the small signal variations and enhance its large signal variations, and a still further integrator for accumulating the output of the second non-linear device to give a final vehicle acceleration signal.

The selection of the input signal to the main filter is made from the highest wheel speed, the lowest wheel speed or some value offset from these. Preferably, the selection is made on the basis of the state of the stop lamp switch and/or the recent history of the vehicle anti-lock slip control system.

The operation of the main filter can be modified in some embodiments such that the input to the first mentioned integration device remains constant or tends to a small negative value when all of the wheel channels are producing skid-corrective actions at the same time.

The effective time constant of the main filter may be arranged to be adjusted in response to the recent history of slip control action, by altering the gain of the non-linear device or any other element in the forward path of the main filter.

In still further embodiments, the characteristics of the non-linear device in the main filter may be modified in response to its error input so as to alter the positive slew rate limit. For example, the non-linear device characteristics may be influenced by the estimated vehicle speed output from the main filter.

The difference between the highest and lowest wheel speeds on the vehicle may be computed and compared with a threshold such that any excursions above said threshold cause the slew rate limit and/or the main filter time constant to be altered to give a better approximation of the vehicle's behaviour.

The wheel speed difference signal can be used to charge or discharge a timer, at different rates, depending upon said difference signal being above a predetermined threshold, this time being in turn compared with another predetermined threshold and the resulting signal being used to modify the main filter characteristics.

The invention is described further hereinafter, by way of example only, with reference to the accompanying drawings, wherein:

FIG. 3 is a signal flow diagram showing the basic embodiment of FIG. 1 modified to include feed forward compensation;

FIG. 4 shows several curves illustrating the operation of the modified filter of FIG. 3;

FIGS. 7a and 7b show a plurality of wheel speed curves used for selection purposes;

FIG. 9 illustrates a means of obtaining fold back of the slew rate limit of the non-linear network in the main filter;

FIGS. 10a and 10b show curves illustrating the operation of the circuitry of FIG. 9;

In accordance with the present system, an estimation of vehicle speed is obtained by combining wheel speed information from one or more of the vehicle wheels with a knowledge of the vehicle dynamics.

Figure 1:
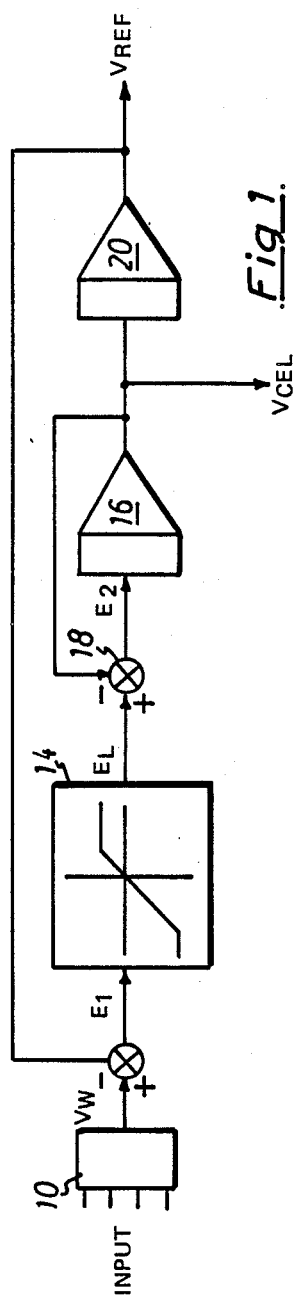
FIG. 1 is a signal flow diagram illustrating a basic embodiment of a main filter used in accordance with the present invention for establishing an estimate of vehicle speed.

Referring first to FIG. 1, wheel speed information from conventional wheel speed sensors (not shown) is fed into a selection network 10 which is arranged to select speed information from one wheel, or a combination of more than one wheel. The selected wheel will usually be the wheel with the highest or lowest speed, as described further hereinafter. The selected wheel speed signal $V_W$ from network 10 has subtracted from it in a subtractor 12 the current value of a vehicle reference speed, referred to as $V_{REF}$, (obtained further on in the circuit), so as to form an error signal E1. It is well known that the actual acceleration or deceleration of a vehicle is limited by the surface friction available and in the case of acceleration possibly also its mass and engine power. Therefore, the error signal $E_1$ is passed through a non-linear device 14 whose function is to Produce an output $E_L$ which can not exceed certain pre-determined limits, whatever the value of the input $E_1$. This non-linear device 14 is illustrated in FIG. 1 as a piece-wise linear device, which has different limiting characteristics for positive and negative errors. The output signal $E_L$ from the device 14 is passed to a first integrator 16 with feedback which is designed to act as a filter producing, in this example, a first order lag. The time constant of this filter 16 may typically be in the range of 100 ms to 500 ms and is arranged to be adjusted during anti-lock cycling to give a further reduction in output ripple. The signal $E_L$ is thus coupled to the integrator 16 by way of a further subtractor 18, which acts as an error forming device by subtracting from $E_L$ the output $V_{CEL}$ of the integrator 16 to form a second error signal $E_2$. After filtering in the integrator 16, the filtered error signal $V_{CEL}$ is fed to a second integrator 20, the output of which is used as $V_{REF}$, the vehicle speed estimate. This is then fed back to the first error forming device 12 for use in forming the first error signal $E_1$.

The system described above forms a filter for the wheel speed signals, designed to remove wheel speed noise, particularly slip cycles caused by anti-lock operation. This filter has impressed upon it certain vehicle characteristics, by incorporating these into its construction.

Figure 2:
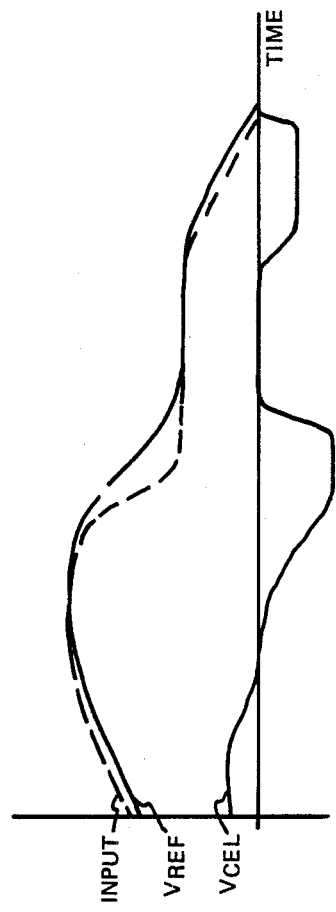
FIG. 2 shows several curves illustrating the operation of the main filter of FIG. 1.

It will be understood that, since the final stage of the above described filter is an integrator (integrator 20), there will be no steady state output error with a steady input speed ($V_W$) since none of the intervening modules creates any offset signal. If a ramped speed signal $V_W$ is introduced the output of the filter will also follow a steady ramp, but will be lagging behind the input. This can be seen in the curves of input signal $V_W$ and $V_{REF}$ shown in FIG. 2. However, since the output element 20 is an integrator the input to it will be proportional to the rate of change of its output. Thus this corresponds to the vehicles acceleration and is referred to hereinafter as $V_{CEL}$ (see again FIG. 2). With this signal $V_{CEL}$ it is possible to improve the basic filter design, as shown in FIG. 3, by combining a proportion of the $V_{CEL}$ signal with the previous filter output, $V_{REF}$. This is achieved in the diagram of FIG. 3 using a summing device 22 which adds a proportion of the $V_{CEL}$ signal, obtained by way of a coefficient 24, with the $V_{REF}$ signal to produce a new reference signal $V_{REF1}$. This new signal $V_{REF1}$ follows the input speed very closely during steady ramp inputs, such as constant braking or acceleration, as illustrated in the curves of FIG. 4.

Figure 5:
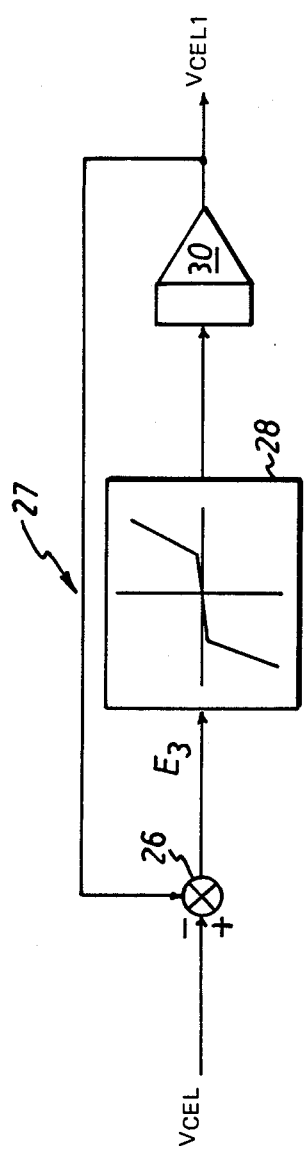
FIG. 5 is signal flow diagram of a supplementary filter used in conjunction with the main filter of FIG. 1 or FIG. 2.
Figure 6:
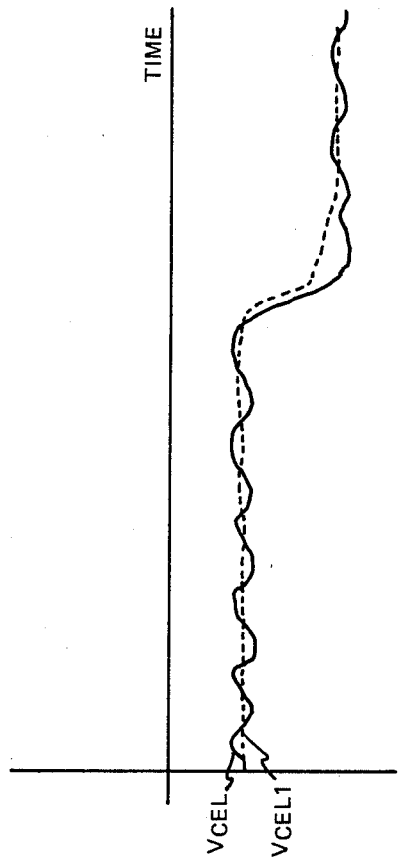
FIG. 6 shows curves illustrating the operation of the supplementary filter of FIG. 5.

It has been found that the $V_{CEL}$ signal mentioned above is of great value in an anti-lock system for shaping various thresholds and decision points. In some less sensitive areas, the $V_{CEL}$ signal is used directly. However, during anti-lock operation this signal will be subject to large variations due to slip cycling of the input to the main filter of FIG. 1. For this reason, a further improvement is sought, as illustrated in FIG. 5. This is in the form of a further special filter 27 designed to enhance the quality of the $V_{CEL}$ signal by being sensitive to large changes in the $V_{CEL}$ signal and being adapted to react quickly to them. However, the latter filter is also designed to ignore smaller changes caused, for example, by slip cycles.

Referring to FIG. 5, the signal $V_{CEL}$ has subtracted from it in a subtractor 26 the prevailing output of the filter 27, referred to as $V_{CEL1}$. This provides an error signal $E_3$ which is fed to a non-linear device 28 designed to enhance the larger changes and suppress the smaller ones. A piece-wise linear function is illustrated, but any similar transfer function can be used and may be different for positive and negative input signals if assymetric characteristics are required. The output of the non-linear device 28 is fed to a further integrator 30, the output of which provides the value $V_{CEL1}$, referred to above. The integration constant of the integrator 30 and the magnitude of the transfer function of the non-linear network 28 determine the time constant for any given size of input transient and therefore define the amplitude and response time of the output $V_{CEL1}$.

Figure 7B:
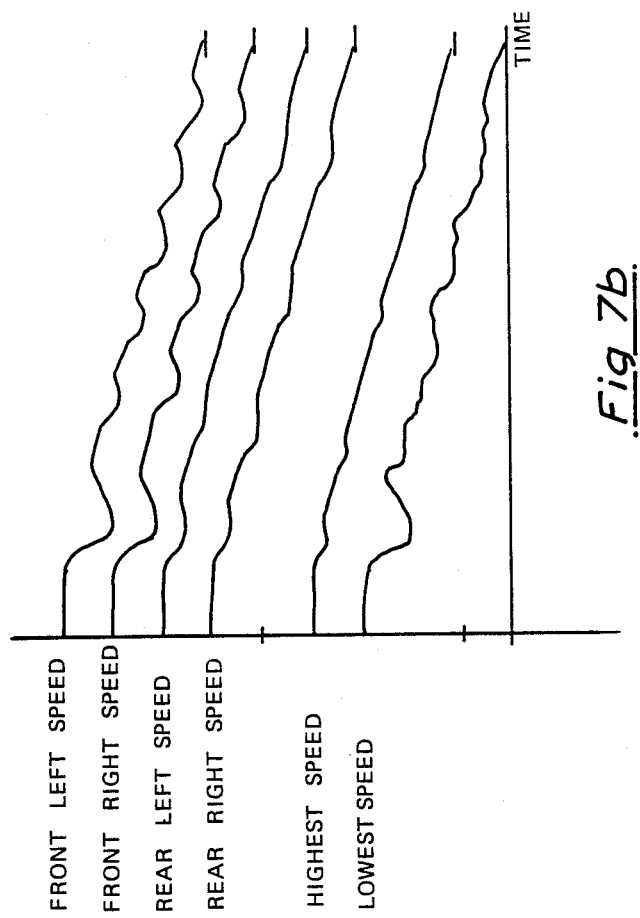

A further aspect of the present vehicle speed estimating system, which strongly influences its performance, is the selection of input signals for the main filter of FIG. 1. During normal driving, particularly during acceleration, it is important to ignore the effects of wheel spin caused by excessive engine power. In the case of two-wheel drive vehicles, the speed signals from the drive axle are ignored, particularly if the brake lamp switch is open and there is no anti-lock cycling. In such a case the lower of the remaining wheel speed signals (referred to as $V_{LO}$) is used (see FIG. 7a). During anti-lock cycling on low mu surfaces, it is possible that several of the wheels will have significant amounts of slip at any one time (see FIG. 7b). In this case, it is advantageous to use the highest wheel speed on the vehicle as the most representative of the true vehicle speed.

Figure 8:
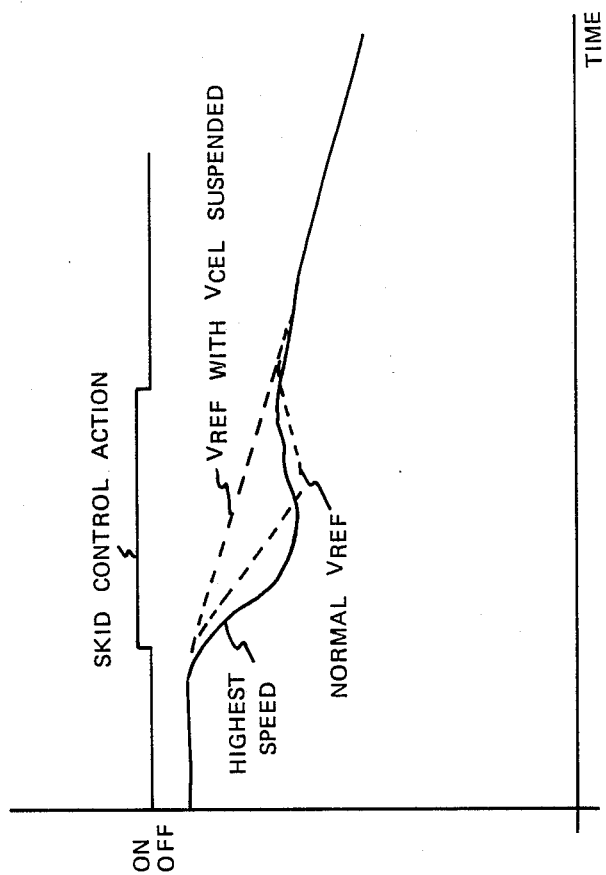
FIG. 8 illustrates the suspension of the $V_{CEL}$ calculation in certain circumstances.

It is desirable to modify the characteristics of the anti-lock system on very low mu surfaces so as to improve the vehicle reference signals. This may involve reducing the pressure and therefore the slip level on one or more wheels. In some cases, all wheels may develop slip at the same time. This is particularly so during the first anti-lock cycle or just as the mu level is reduced suddenly. In this case, even using the wheel with the highest speed as the filter input $V_W$ may not avoid a dip in the $V_{REF}$ signal. This situation is overcome by noting that all wheels will be generating skid correction signals at the same time. In this event, the operation of the main filter of FIG. 1 is suspended such that the $V_{CEL}$ signal is held constant Thus, the $V_{REF}$ decay rate will remain constant, as shown in FIG. 8. On a very low mu surface, due to anti-lock cycling, it is possible that the $V_{CEL}$ signal may become positive for short periods particularly if the surface mu level is non-constant. If the $V_{CEL}$ signal were held constant in this state, it would have strongly deleterious results for $V_{REF}$ since this would rise while the true vehicle speed was falling. In such a case, $V_{CEL}$ is allowed to reduce to a value which is slightly negative, the latter value being chosen to represent the vehicle's behaviour on such a surface.

For four-wheel drive vehicles, some of the assumptions made above do not necessarily hold. To deal with this situation, three refinements are added to the basic system of FIG. 1.

Firstly, in order to help detect wheel spin it is possible to compare the highest and lowest wheel speeds (referred to as $V_{HI}$ and $V_{LO}$). During normal driving, these may differ by a small amount due to cornering. During anti-lock operation they may be different due to slip cycling. However, this situation may be easily determined by examining the skid correction signals. The only other time the highest and lowest wheel speeds will differ significantly is during wheel spin during acceleration. This difference is used to alter the selection of the filter input and/or the characteristics of the non-linear limiting network 14 in the main filter. Specifically, the positive error limit is arranged to be reduced. Furthermore, a timer is used in conjunction with this speed difference signal such that when the difference exceeds a threshold, the timer is charged up. Then, when the spin disappears, the timer is allowed to decay, possibly at a lower rate. Whenever the timer is above a threshold, the wheels are assumed to be spinning.

A second refinement is to reduce the non-linear network's positive limit if the input error $E_1$ reaches a certain predetermined limit as indicated in FIG. 9. FIGS. 10a and 10b illustrate the effect of folding back the slew rate of the main filter in this way. Typically, the output of the filter would correspond to the vehicle's behaviour with all wheels spinning on a low adhesion surface, since this is the most likely cause of the situation.

A third refinement is to alter the positive limiting value of the non-linear network 14 in response to the estimated vehicle speed $V_{REF}$. This allows the filter to more closely model the real behaviour of the vehicle and improve the compromise between the real vehicle speed and the value of the estimate, $V_{REF}$, during wheel spin. The value of $V_{REF}$ is also used to modify the action taken when a speed difference is detected. At low speeds, the uncertainty associated with wheel spin may cause the $V_{REF}$ signal to tend toward zero, while at higher speeds it could tend towards the lowest wheel speed.

Figure 11:
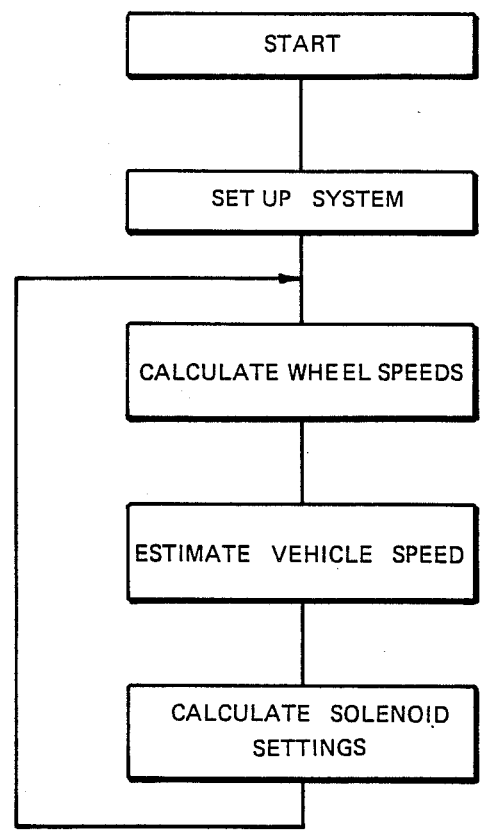
FIG. 11 is a basic program flow diagram of the overall system for establishment of vehicle speed.

Referring now to FIG. 11, there is shown a basic program flow diagram of the overall system for vehicle speed estimation.

FIGS. 12a to 12d show a more detailed program flow diagram illustrating the performance of the necessary calculations in a practical embodiment of the "estimate vehicle speed" section of FIG. 11.

The selection of the input signal to the main filter is made from the highest wheel speed, the lowest wheel speed or some value offset from these. Preferably, the selection is made on the basis of the state of the stop lamp switch and/or the recent history of the vehicle anti-lock slip control system.

Figure 12A:
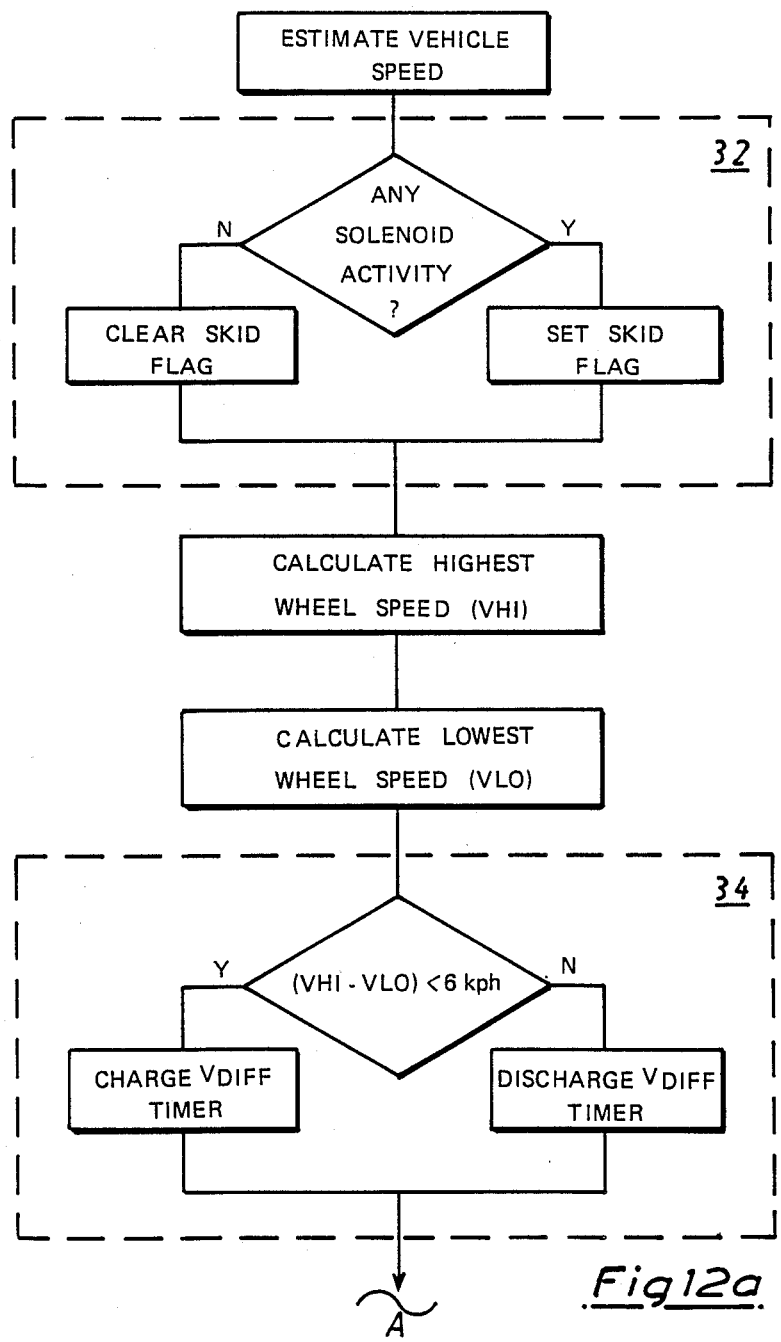
FIGS. 12a, 12b, 12c, 12d show a program flow diagram illustrating a number of preferred features of the system.
Figure 12B:
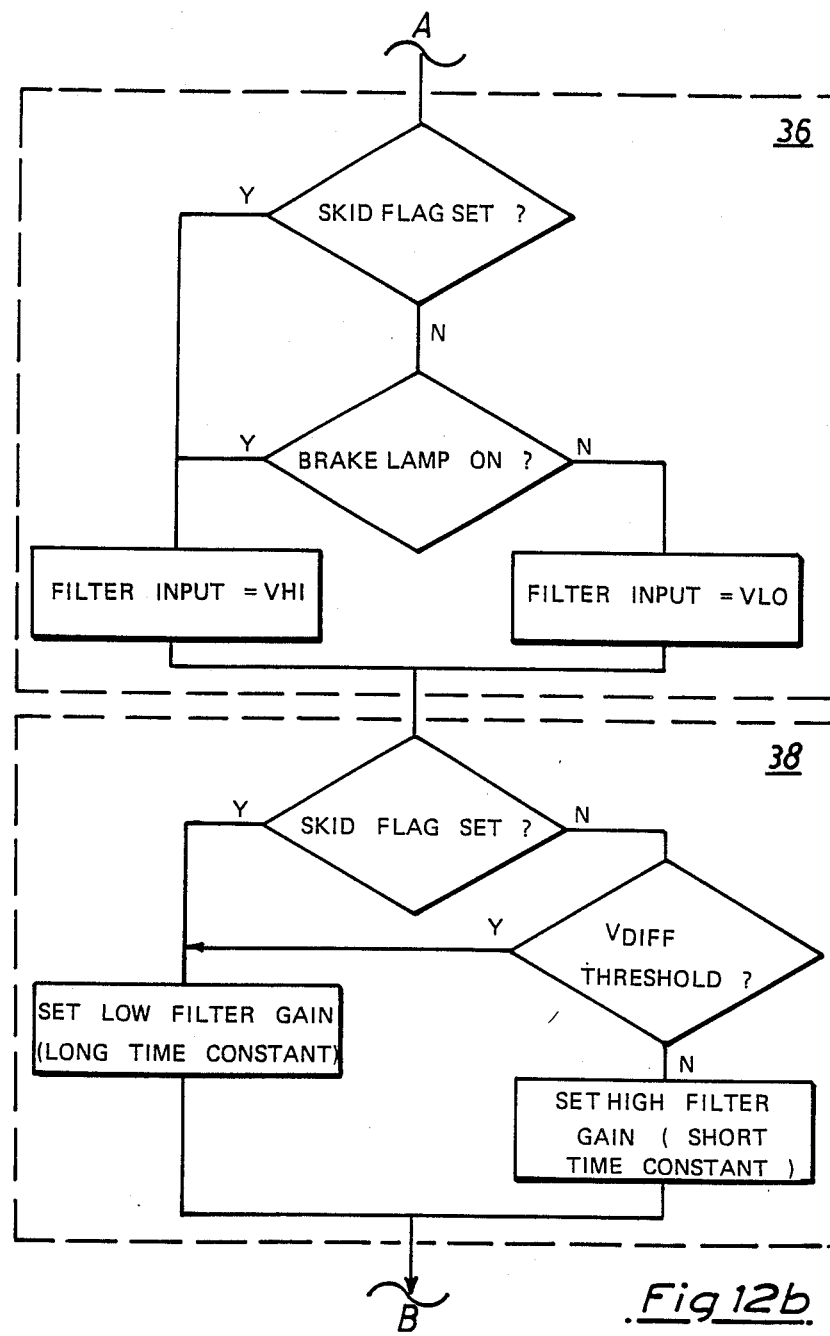
Figure 12C:
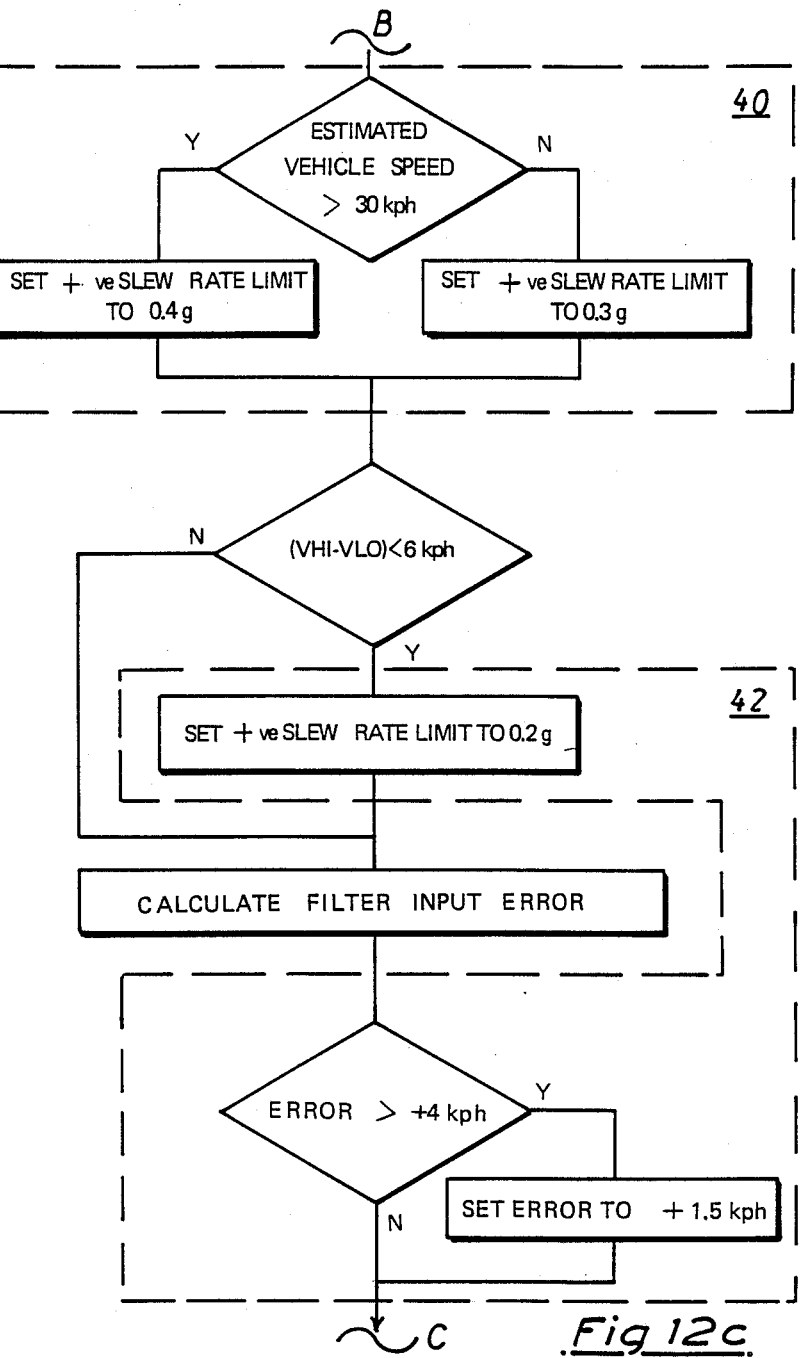
Figure 12D:
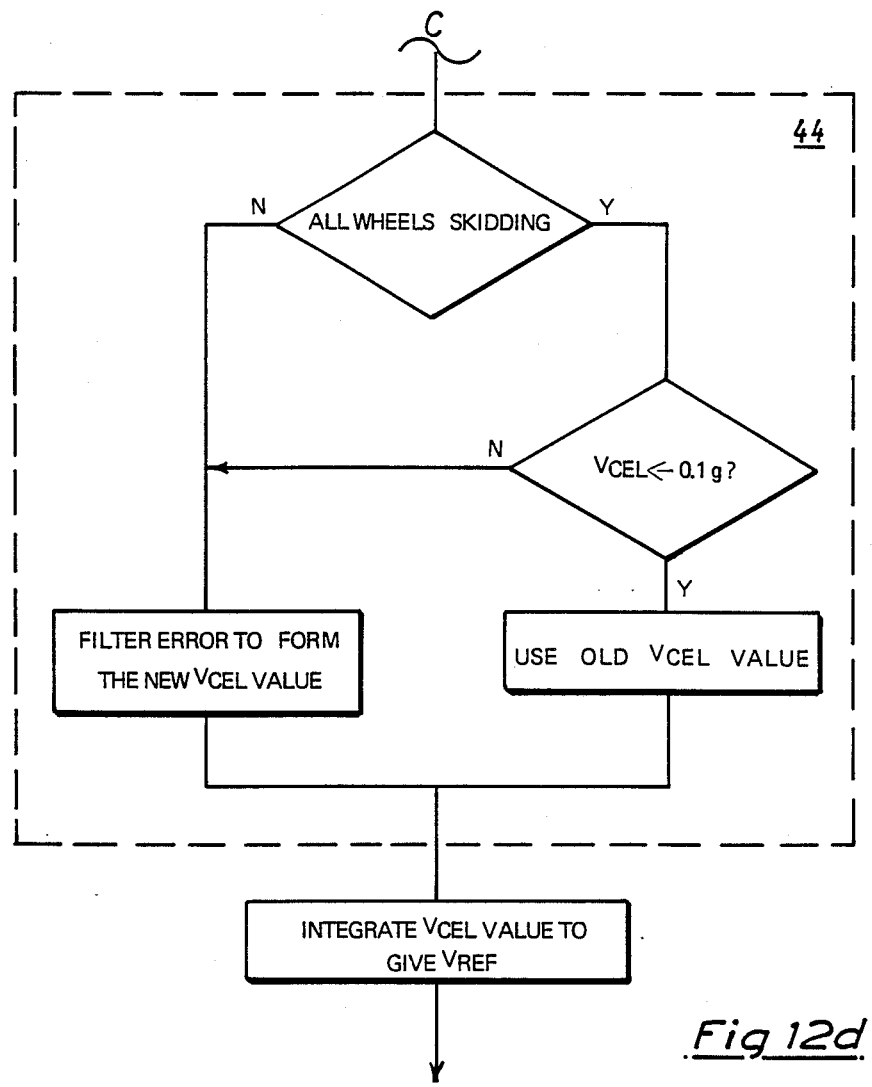

The recent history of the slip control system (solenoid activity) is recorded in section 32 (see FIG. 12d). This data is used in conjunction with the stop lamp switch signal in section 36 (FIG. 12b) to control the selection of data for the filter input.

The operation of the main filter can be modified in some embodiments such that the input to the first mentioned integration device remains constant or tends to a small negative value when all of the wheel channels are producing skid-corrective actions at the same time, as shown in section 44 of FIG. 12d.

The effective time constant of the main filter may be arranged to be adjusted in response to the recent history of slip control action, by altering the gain of the non-linear device or any other element in the forward path of the main filter, as shown in section 38 of FIG. 12b.

The characteristics of the non-linear device in the main filter may be modified in response to its error input so as to alter the positive slew rate limit. For example, the non-linear device characteristics may be influenced by the estimated vehicle speed output from the main filter, as illustrated in section 40 of FIG. 12c.

The difference between the highest and lowest wheel speeds on the vehicle may be computed and compared with a threshold such that any excursions above said threshold cause the slew rate limit and/or the main filter time constant to be altered to give a better approximation of the vehicle's behaviour, see section 34 of FIG. 12a.

The wheel speed difference signal can be used to charge or discharge a timer, at different rates, depending upon said difference signal being above a predetermined threshold, this time being in turn compared with another predetermined threshold and the resulting signal being used to modify the main filter characteristics, illustrated in section 38 of FIG. 12b.

I claim:

1. An anti-lock system for controlling the slip level on at least one wheel of a vehicle by comparing the actual wheel speed with a vehicle reference speed obtained by processing wheel speed signals through a filtering system, the filtering system comprising
    a selection means which produces an input signal from at least one of the wheel speeds,
    an error forming device which subtracts the required vehicle speed estimate from the said input signal to produce a speed error ($E_1$),
    a non-linear device which is effective to limit the slew rate of the filtering system in both positive and negative directions in accordance with vehicle characteristics,
    a secondary filter which reduces transients present in the error signal, and
    an integration device which accumulates said error signal and whose output is fed back to said error forming device as the required vehicle speed estimate ($V_{REF}$).

2. An anti-lock system according to claim 1, further including means for extracting the input ($V_{CEL}$) to said integration device to provide a signal indicative of the vehicle's acceleration, and means for adding a proportion of this extracted signal to the output ($V_{REF}$) of the main filtering system to form a better approximation ($V_{REF1}$) of the true vehicle speed.

3. An anti-lock system according to claim 2, further including means for passing the vehicle acceleration signal ($V_{CEL}$) extracted from the input to said integration device through a further filter adapted to enhance the information contained therein.

4. An anti-lock system according to claim 3, wherein said further filter comprises a further error forming device which subtracts the output ($V_{CEL1}$) of the further filter from the acceleration signal ($V_{CEL}$) to form an acceleration error signal ($E_3$), a second non-linear device through which the acceleration error signal ($E_3$) is passed to suppress its small signal variations and enhance its large signal variations, and a still further integrator for accumulating the output of the second non-linear device to give a final vehicle acceleration signal ($V_{CEL1}$).

5. An anti-lock system according to claim 1, including means which causes the selection of the input signal to the main filter to be made from one of the highest wheel speed, the lowest wheel speed and some value offset from these.

6. An anti-lock system according to claim 5, wherein said means causes for said selection to be made on the basis of at least one of the state of the stop lamp switch of the vehicle and the recent history of the vehicle anti-lock slip control system.

7. An anti-lock system for controlling the slip level on at least one wheel of a vehicle by comparing the actual wheel speed with a vehicle reference speed obtained by processing wheel speed signals through a filtering system, the filtering system comprising a selection means which produces an input signal from at least one of the wheel speeds, an error forming device which subtracts the required vehicle speed estimate from the said input signal to produce a speed error ($E_1$), a non-linear device which is effective to limit the slew rate of the filtering system in both positive and negative directions in accordance with vehicle characteristics, a secondary filter which reduces transients present in the error signal, and an integration device which accumulates said error signal and whose output is fed back to said error forming device as the required vehicle speed estimate ($V_{REF}$), and means for modifying the operation of the main filter such that the input to the integration device remains constant to a small negative value when all of the wheel channels are producing skid-corrective action at the same time.

8. An anti-lock system for controlling the slip level on at least one wheel of a vehicle by comparing the actual wheel speed with a vehicle reference speed obtained by processing wheel speed signals through a filtering system, the filtering system comprising a selection means which produces an input signal from at least one of the wheel speeds, an error forming device which subtracts the required vehicle speed estimate from the said input signal to produce a speed error ($E_1$), a non-linear device which is effective to limit the slew rate of the filtering system in both positive and negative directions in accordance with vehicle characteristics, a secondary filter which reduces transients present in the error signal, and an integration device which accumulates said error signal and whose output is fed back to said error forming device as the required vehicle speed estimate ($V_{REF}$), and means for modifying the operation of the main filter such that the input to the integration device tends to a small negative value when all of the wheel channels are producing skid-corrective action at the same time.

9. An anti-lock system for controlling the slip level on at least one wheel of a vehicle by comparing the actual wheel speed with a vehicle reference speed obtained by processing wheel speed signals through a filtering system, the filtering system comprising a selection means which produces an input signal from at least one of the wheel speeds, an error forming device which subtracts the required vehicle speed estimate from the said input signal to produce a speed error ($E_1$), a non-linear device which is effective to limit the slew rate of the filtering system in both positive and negative directions in accordance with vehicle characteristics, a secondary filter which reduces transients present in the error signal, an integration device which accumulates said error signal and whose output is fed back to said error forming device as the required vehicle speed estimate ($V_{REF}$), and means for adjusting the effective time constant of the main filter in response to the recent history of slip control action, by altering the gain of the non-linear device.

10. An anti-lock system according to claim 9, including means for computing the difference between the highest and lowest wheel speeds on the vehicle and for comparing same with a threshold such that any excursions above said threshold cause at least one of the slew rate limit and the main filter time constant to be altered to give a better approximation of the vehicle's behaviour.

11. An anti-lock system according to claim 10, including means using the wheel speed difference signal to charge/discharge a timer, at different rates, depending upon said difference signal being above a predetermined threshold, this time being in turn compared with another predetermined threshold and the resulting signal being used to modify the main filter characteristics.

12. An anti-lock system for controlling the slip level on at least one wheel of a vehicle by comparing the actual wheel speed with a vehicle reference speed obtained by processing wheel speed signals through a filtering system, the filtering system comprising a selection means which produces an input signal from at least one of the wheel speeds, an error forming device which subtracts the required vehicle speed estimate from the said input signal to produce a speed error ($E_1$), a non-linear device which is effective to limit the slew rate of the filtering system in both positive and negative directions in accordance with vehicle characteristics, a secondary filter which reduces transients present in the error signal, an integration device which accumulates said error signal and whose output is fed back to said error forming device as the required vehicle speed estimate ($V_{REF}$), and means for modifying the characteristics of the non-linear device in the main filter in response to its error input so as to alter the positive slew rate limit.

13. An anti-lock system according to claim 12, including means for influencing the characteristics of the non-linear device by the estimated vehicle speed output from the main filter.

14. An anti-lock system according to claim 13, including means for computing the difference between the highest and lowest wheel speeds on the vehicle and for comparing same with a threshold such that any excursions above said threshold cause at least one of the slew rate limit and the main filter time constant to be altered to give a better approximation of the vehicle's behaviour.

15. An anti-lock system according to claim 14, including means using the wheel speed difference signal to charge/discharge a timer, at different rates, depending upon said difference signal being above a predetermined threshold, this time being in turn compared with another predetermined threshold and the resulting signal being used to modify the main filter characteristics.

16. An anti-lock system according to claim 12, including means for computing the difference between the highest and lowest wheel speeds on the vehicle and for comparing same with a threshold such that any excursions above said threshold cause at least one of the slew rate limit and the main filter time constant to be altered to give a better approximation of the vehicle's behaviour.

17. An anti-lock system according to claim 16, including means using the wheel speed difference signal to charge/discharge a timer, at different rates, depending upon said difference signal being above a predetermined threshold, this time being in turn compared with another predetermined threshold and the resulting signal being used to modify the main filter characteristics.

* * * * *